G. GÁRDONYI.
REFRIGERATOR.
APPLICATION FILED OCT. 11, 1912.
1,107,928.
Patented Aug. 18, 1914.
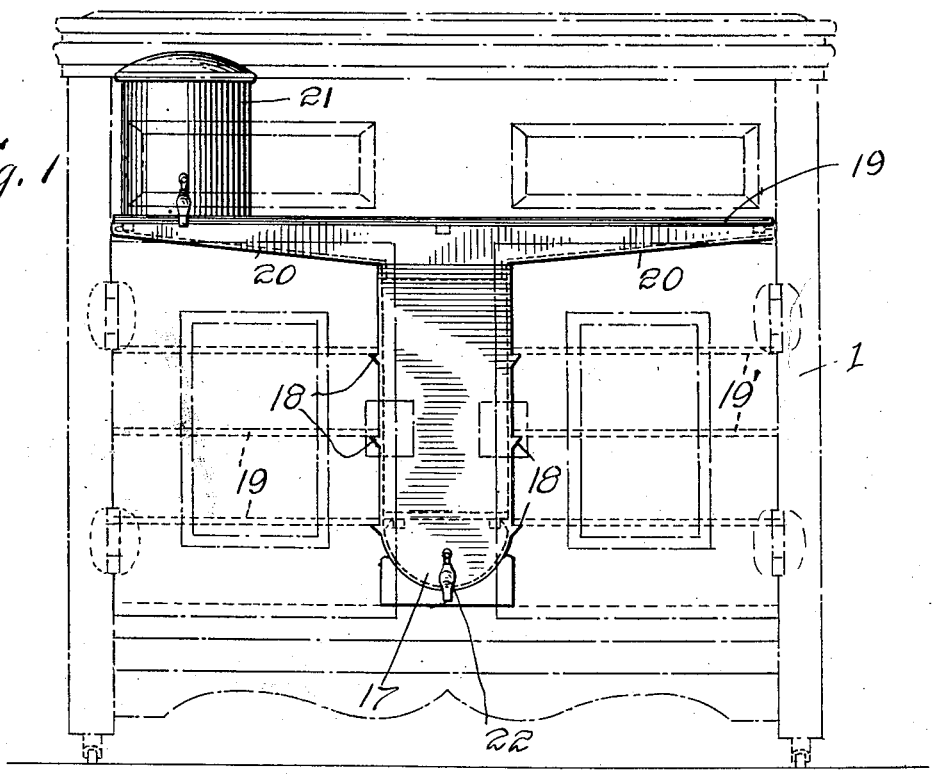
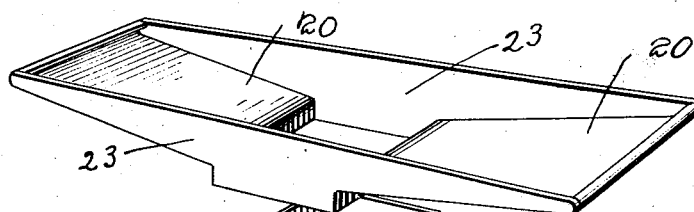
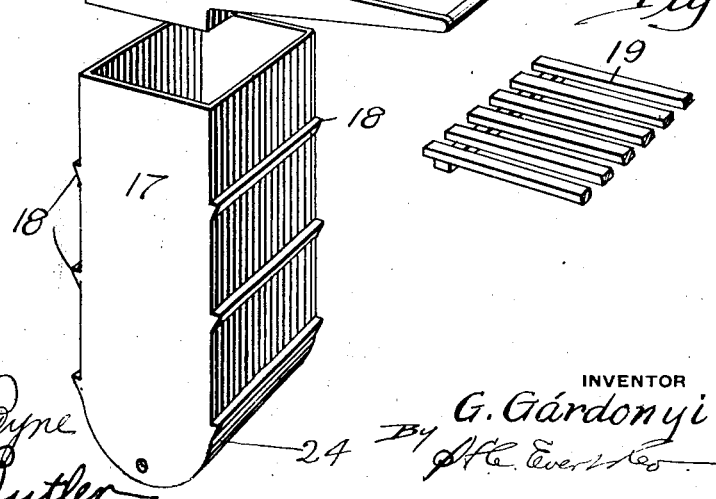
WITNESSES
INVENTOR
G. Gárdonyi
ATTORNEYS

UNITED STATES PATENT OFFICE.

GIZA GÁRDONYI, OF CLEVELAND, OHIO.

REFRIGERATOR.

1,107,928.

Specification of Letters Patent. Patented Aug. 18, 1914.

Application filed October 11, 1912. Serial No. 725,207.

*To all whom it may concern:*

Be it known that I, GIZA GÁRDONYI, a subject of the King of Hungary, residing at Cleveland, in the county of Cuyahoga and State of Ohio, have invented certain new and useful Improvements in Refrigerators, of which the following is a specification, reference being had therein to the accompanying drawings.

This invention relates to refrigerators, ice boxes and receptacles adapted to contain a refrigeratory agent for the cooling of drinking water and the preserving of matter placed within the refrigerator.

The primary object of my invention is to provide a refrigerator with a novel drip pan or receptacle for collecting the drippings of the refrigeratory agent used in connection with the refrigerator.

A further object of this invention is to accomplish the above result by a mechanical construction that is durable, inexpensive to manufacture and applicable to various types of refrigerators and ice boxes.

With the above and other objects in view the invention resides in the novel construction, combination and arrangement of parts to be hereinafter specifically described and then claimed.

Reference will now be had to the drawing wherein is illustrated the preferred embodiment of my invention, but it is to be understood that the structural elements are susceptible to such changes, in size, shape and manner of assemblage as fall within the scope of the appended claim.

In the drawing:—Figure 1 is a front elevation of the drip pan applied to a double compartment refrigerator, Fig. 2 is a perspective view of the drip pan shown in Fig. 1, Fig. 3 is a perspective view of a portion of a slatted refrigeratory agent support.

Referring to the drawings in detail, 1 denotes a refrigerator in which is arranged centrally a pan 17. The sides of the pan are provided with transverse ribs 18 adapted to support the ends of shelves 19'. The top of the pan 17 is provided with a double drain tray 20 corresponding in length to the refrigerator and this tray deflects drippings into the pan 17. Said tray is formed with a pair of side walls 23, each consisting of a central portion and a pair of end portions each gradually increasing in width from its outer end toward said intermediate portion, and having the inner terminus of less width than that of the intermediate portion. The drip pan 17, is rectangular in plan, having an open upper end and a rounded closed bottom 24. The rectangular center portion of the tray fitting within the open end of the drip pan 17. The tray 20 is capable of supporting a receptacle or tank 21 within the refrigerator for drinking water, and the pan has a drain cock 22 that permits of water being easily removed from the pan. In some instances a refrigeratory agent as crushed ice, can be placed in the pan 17.

The tray comprises a pair of oppositely disposed bottom sections, each of which is of a length less than half the length of a side wall and each of the bottom sections having the outer end rounded. The rounded ends are secured between the ends of the side walls and constitute the end walls of the tray, each of the sections having its inner end terminating in a depending portion flush with the lower edge of said intermediate portions. The depending portions and the intermediate portions extend into the top of the pan, the bottom sections resting upon the top edges of the side walls of the pan.

From the foregoing it will be observed that I have devised a detachable container for a refrigeratory agent that permits of the interior of the refrigerator or ice box being easily and quickly cleaned and maintained in a sanitary condition, the drip pan in one instance serving as a means for maintaining a cooling agent, while in another instance the drain tray of the drip pan is capable of supporting a receptacle containing water for drinking purposes.

What I claim is:—

The combination with a refrigerator having a compartment provided with shelves, a vertically extending drip pan substantially rectangular in plan, having a rounded bottom and further having an outlet in close proximity to said bottom, transverse ribs formed on said pan and adapted to support said shelves, a rectangular drain tray including a pair of side walls each consisting of a rectangular central portion and a pair of end portions each gradually increasing in width from its outer end toward said intermediate portion and having the inner terminus thereof of less width than the width of said intermediate portion, said tray further including a pair of oppositely disposed upwardly inclined bottom sections, each of said sections of a length less than half the length of a side wall, each of said bottom sections having its outer end rounded, said rounded ends secured between the ends of said side walls and constituting end walls of said tray, each of said sections having its inner end terminating in a depending portion flush with the lower edge of said intermediate portions, said depending portions and said intermediate portions extending into the top of said pan, said bottom sections resting upon the top edges of the side walls of said pan.

In testimony whereof I affix my signature in the presence of two witnesses.

GIZA GÁRDONYI.

Witnesses:
   ANTHONY LIECK,
   BÉLA ZÁBOLY.